(12) United States Patent
Higgins et al.

(10) Patent No.: US 10,732,620 B2
(45) Date of Patent: Aug. 4, 2020

(54) SYSTEM AND METHOD FOR INSPECTING MACHINERY

(71) Applicant: General Electric Company, Schenectady, NY (US)

(72) Inventors: Christopher D. Higgins, Greenville, SC (US); Michael Tishenkel, Greenville, SC (US)

(73) Assignee: General Electric Company, Schenectady, NY (US)

( * ) Notice: Subject to any disclaimer, the term of this patent is extended or adjusted under 35 U.S.C. 154(b) by 458 days.

(21) Appl. No.: 15/225,238

(22) Filed: Aug. 1, 2016

(65) Prior Publication Data

US 2018/0032068 A1    Feb. 1, 2018

(51) Int. Cl.
*G05B 23/02* (2006.01)
*G06F 16/2455* (2019.01)
*G05B 17/02* (2006.01)
*G07C 3/00* (2006.01)

(52) U.S. Cl.
CPC ......... *G05B 23/0272* (2013.01); *G05B 17/02* (2013.01); *G06F 16/2455* (2019.01); *G07C 3/00* (2013.01); *G05B 2219/31316* (2013.01)

(58) Field of Classification Search
CPC .. G05B 23/0272; G07C 3/00; G06F 17/30477
USPC ....................................................... 700/109
See application file for complete search history.

(56) References Cited

U.S. PATENT DOCUMENTS

| 8,606,665 B1 | 12/2013 | Shaw |
| 2012/0191496 A1 | 7/2012 | Muench et al. |
| 2014/0188473 A1 | 7/2014 | Lambdin et al. |

OTHER PUBLICATIONS

Extended European Search Report and Opinion issued in connection with corresponding EP Application No. 17182720.7 dated Dec. 13, 2017.

*Primary Examiner* — Anthony Ho
(74) *Attorney, Agent, or Firm* — Eversheds Sutherland (US) LLP

(57) ABSTRACT

A system for inspecting a machine including a server with a data storage device accessible by client devices is disclosed. The system can include a mobile inspection tool operatively coupled to the server via a communication network. The mobile inspection tool is operable to receive a request to perform an inspection of a machine unit, provide a graphical user interface to guide a user in performing the inspection, receive an identification of the machine unit, and provide questions to the user, and receive answers from the user. The answers can be related to a defect in the machine unit. The mobile inspection tool can be further operable to acquire measurement input, such as a defect value measured by a digital measurement tool, and cause the server to store the answers and the measurement input in the data storage device.

20 Claims, 3 Drawing Sheets

SYSTEM AND METHOD FOR INSPECTING MACHINERY

TECHNICAL FIELD

The disclosure relates to machinery inspection. More particularly, this disclosure relates to systems and methods for inspecting machinery, such as turbomachines.

BACKGROUND

Machinery is widely used in modern industries. For example, machinery can be found in the power generation industry, oil and gas industry, aircraft industry, manufacturing equipment, and so forth. Normally, during machine operation, machine parts or units may degrade and encounter unwanted conditions such as wear and tear, corrosion, cracks, fractures, deformations, electrical failures, and other conditions that negatively affect the operation and effectiveness of the equipment. For example, turbine blades can be prone to mechanical damages over time, such as fractions or deformations, leading to abnormal vibrations or even an outage of the turbine.

Regular inspection, examination, and testing of the machinery can be useful for maintaining proper and intended operation of the machinery for a long period. In certain instances, there are inspection regulations in many industries that require performing predetermined tests and periodic measurements. Inspectors can typically use inspection template spreadsheets for making notes in regard to certain testing operations. Unfortunately, the inspection template notes are often written by hand, thereby making them difficult to aggregate and analyze. Moreover, inspection templates are often not uniform between inspection sites. For example, inspectors may not use any standards to describe a particular damage or problem with a certain machine unit. Thus, nearly identical issues can be described differently, thereby making it difficult to analyze the inspection data.

Additionally, inspectors may fail to properly examine machinery due to the complex nature of the machinery being tested. For example, an aircraft engine may have millions of parts. It can be a time-consuming and challenging task to locate certain engine parts and examine them according to predetermined standards. The inspectors do not always have access to inspection guidelines or may not be aware of how to perform certain tests, especially when they deal with a new type of machinery. Accordingly, inspection is, for the most part, a manual process, which is not uniform across industries or even sites of the same organization, and consumes a large amount of resources and time for planning, execution, and analysis.

BRIEF DESCRIPTION OF THE DISCLOSURE

This disclosure relates to systems and methods for inspecting machinery, such as turbomachinery. Certain embodiments of this disclosure can simplify and make uniform the inspection process, and facilitate detection, prediction, and minimize certain life-limiting machine failures.

According to one example embodiment of the disclosure, a system for inspecting a machine is provided. The system can include a server including a data storage device accessible by one or more client devices via at least one communication network. The system also includes a mobile inspection tool operatively coupled to the server via the at least one communication network. The mobile inspection tool can be operable to perform the following operations: receive a request to perform an inspection of a unit of a machine, provide a graphical user interface to guide a user of the mobile inspection tool in performing the inspection, and receive, via the graphical user interface, an identification of the unit of the machine to be inspected. The identification of the unit of the machine can include a serial number associated with the unit of the machine. Based on the identification, the mobile inspection tool is operable to provide, via the graphical user interface, one or more questions to the user. The questions can also guide the user in locating and measuring the defect. Responsive to the questions, the mobile inspection tool is operable to receive at least one answer from the user, wherein the at least one answer is related to a defect in the unit of the machine. In certain embodiments, some or all of the answers can include a selected standardized defect of the unit of the machine. The mobile inspection tool is further operable to acquire at least one measurement input associated with the defect in the unit of the machine, and cause the server to store the at least one of the answer and the at least one measurement input in the data storage device.

In certain embodiments, the mobile inspection tool is also operable to associate a time and a date with the at least one answer and the at least one measurement input and attribute a metadata tag to the at least one answer and to the at least one measurement input. The metadata tag can be associated with the unit of the machine.

In certain embodiments, the system can further include a digital measurement tool in operative communication with the mobile inspection tool. The mobile inspection tool can be further operable to cause a digital measurement tool to measure the defect to produce a measurement value and wirelessly receive the measurement value from the digital measurement tool, wherein the measurement value includes at least a part of the at least one measurement input. The measurement input may include an image or a video of the defect. In some embodiments, at least one of the answers and at least one measurement input are stored in a data container available to one or more client devices and one or more mobile inspection tools such that data associated with the data container is available for searches and queries.

In certain embodiments, the mobile inspection tool or the server is also operable to build a damage accumulation model based on the at least one answer and the at least one measurement input stored in the data storage and, based on the damage accumulation model, predict a failure of the unit of the machine.

According to another example embodiment of the disclosure, a method for inspecting turbomachinery is provided. The method can include receiving a request to inspect a unit of turbomachinery by a mobile inspection tool, providing a graphical user interface associated with the mobile inspection tool to guide a user of the mobile inspection tool in performing an inspection of the unit of turbomachinery, and receiving, via the graphical user interface, an identification of the unit of turbomachinery to be inspected. The identification of the unit of turbomachinery can include a serial number associated with the unit of turbomachinery.

The method can also include providing, based on the identification and via the graphical user interface, a plurality of questions to the user. At least one of the questions guides the user in locating and measuring the defect. Responsive to the questions, at least one answer is received by the mobile inspection tool, where at least one answer is related to a defect in the unit of turbomachinery. Moreover, some answers can include a selected standardized defect of the unit of turbomachinery. The method further acquires at least one measurement input associated with the defect in the unit of turbomachinery and stores, by a server, the at least one answer and the at least one measurement input in a data storage device.

In certain embodiments, the method can further include associating a time and a date with the at least one answer and the at least one measurement input and attributing a metadata tag to the at least one answer and to the at least one measurement input, where each of the metadata tags can be associated with the unit of turbomachinery.

In certain embodiments, the measurement input associated with the defect can be acquired by causing, by the mobile inspection tool, a digital measurement tool to determine a measurement of the defect and wirelessly receiving, by the mobile inspection tool, the measurement from the digital measurement tool. The measurement inputs can include an image or a video of the defect.

In certain embodiments, the answers and the measurement inputs can be stored in a data container available for one or more client devices and one or more mobile inspection tools such that the data container is a part of a database operable to be searched and queried.

In certain embodiments, the method can further include building a damage accumulation model based on the at least one answer and the at least one measurement input stored in the data storage device and, based on the damage accumulation model, predicting a failure of the unit of turbomachinery.

In certain embodiments, the method can further include collecting, by the server, in the data storage device, inspection data related to a plurality of units of turbomachinery, wherein the inspection data includes the at least one answer and the at least one measurement input, periodically evaluating the inspection data by the server, and selecting, based on the evaluation, from the plurality of units of turbomachinery one candidate unit of turbomachinery for an inspection.

According to yet another example embodiment of the disclosure, a non-transitory processor-readable medium having software codes stored thereon is provided. When the software codes are executed by one or more processors, the software codes cause the one or more processors to implement the method for inspecting turbomachinery as described above.

Other embodiments, systems, methods, features, and aspects will become apparent from the following description taken in conjunction with the following drawings.

Figure 1:
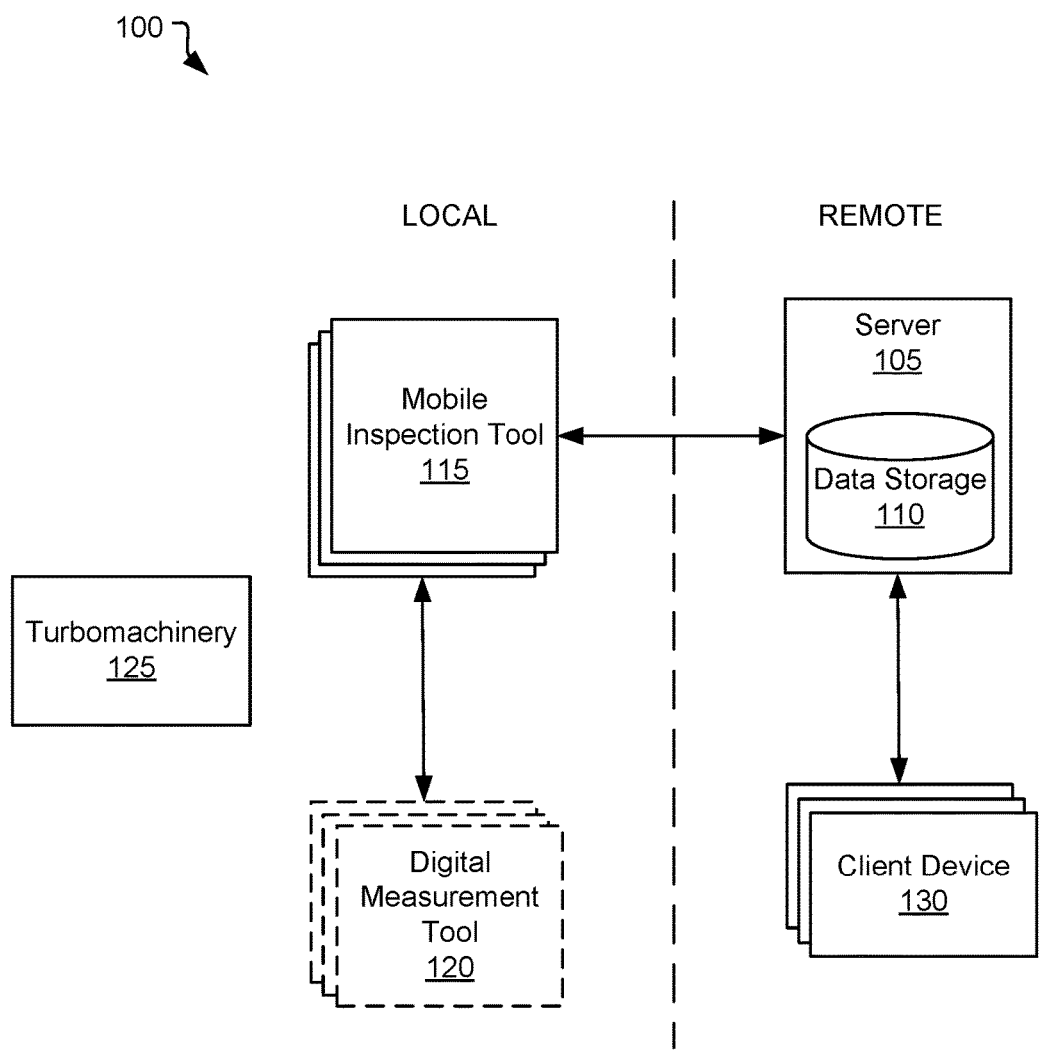
FIG. 1 is a block diagram illustrating an example system for inspecting turbomachinery, according to certain embodiments of the disclosure.

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

DETAILED DESCRIPTION

Certain embodiments of the disclosure can include systems and methods for inspecting machinery, such as turbomachines. Although certain embodiments provided herein refer to turbomachine inspections, other machines or equipment can be inspected using the principles described in this document. Certain embodiments of the disclosed systems and methods can facilitate the machinery inspection process, enhance uniformity of inspection data collection, and provide a single inspection data storage to enable inspection data analysis and prediction of machinery failures.

According to certain embodiments of this disclosure, a system for inspecting a machine may include a server and at least one mobile inspection tool for an inspector. The mobile inspection tool can include a tablet computer, a borescope, a laptop computer, a smart phone, and so forth. The mobile inspection tool can be operatively connected to the server via one or more communication networks. The mobile inspection tool can include a web browser to enable an inspector to access a predetermined web resource (e.g., a web page or a web service) to perform an inspection as described herein. Alternatively, the mobile inspection tool can include a software application configured to provide an inspection routine as described herein. In some embodiments, there can be a combination of two solutions (e.g., software application and web service). In either embodiment, the mobile inspection tool may provide a plurality of graphical user interfaces (GUIs) to guide the inspector in performance of the inspection of a particular piece of machine or equipment. The guidance can include a series of questions or instructions to enable the inspector to locate a particular piece of a machine, perform measurements specific to this machine piece, and store the inspector's answers and measurement inputs in the data storage on the server side. The answers and measurement inputs can be meta-tagged and provided in a uniform manner to enable the server to analyze and compare the answers and measurement inputs to each other. The analysis of inspection data collected in the data storage can also facilitate building damage accumulation models, predicting machinery failures, providing early indications of deterioration, and providing early productivity programs for machinery life extension. The inspection data collected from a plurality of mobile inspection tools can also be accessed by authorized individuals via client devices, such as desktop computers operatively connected to the server via one or more communication networks. The authorized individuals can get detailed inspection reports including unified defect descriptions, measurement data, graphs, tables, data comparisons, images, recommendations, predictions, estimates, and the like.

Technical effects of certain embodiments of the disclosure may include enhancing the collation and uniformity of inspection data collection to enable inspection data analysis for early detection of defects and prediction of machinery outages.

For purposes of this patent document, the terms "or" and "and" shall mean "and/or" unless stated otherwise or clearly intended otherwise by the context of their use. The term "a"

shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Additionally, the terms "first," "second," "third," and so forth can be used herein to describe various elements. These terms are used to distinguish one element from another, but not to imply a required sequence of elements. For example, a first element can be termed a second element, and, similarly, a second element can be termed a first element, without departing from the scope of present teachings. Moreover, it shall be understood that when an element is referred to as being "connected" or "coupled" to another element, it can be directly connected or coupled to the other element or it can be indirectly, but operatively connected or coupled via one or more intervening elements.

The term "mobile inspection tool" can be construed to include any portable electronic device having a data network interface, input/output interface and processing means. Examples of a mobile inspection tool can include a cellular phone, a mobile phone, a smart phone, a tablet computer, a laptop computer, a portable computing device, a personal digital assistant, a borescope, and so forth. The term "user" and "inspector" can be used interchangeably and shall be construed to include an individual who operates a mobile inspection tool. The term "turbomachinery" can include, in certain embodiments, turbo machines, turbines, engines, power generation equipment, rotational equipment, manufacturing equipment, and so forth. The term "inspection data" can be construed to include any data collected during an inspection process. The inspection data can include answers (e.g., text, selections), measurement values, measurement inputs, images, video, audio, tables, graphs, or any other digital information associated with at least one element of a machine, its operation, or a defect.

The following provides a detailed description of various example embodiments related to systems and methods for inspecting machinery. Turning now to the drawings, FIG. 1 is a block diagram illustrating an example system 100 for inspecting turbomachinery, according to certain embodiments of the disclosure. The system 100 for inspecting turbomachinery can includes at least one server 105 (or web service) which is associated with data storage 110 for collecting, managing, and storing inspection data. The server 105 and data storage 110 can be located remotely to machinery to be inspected.

The system 100 for inspecting turbomachinery can further include at least one mobile inspection tool 115 for the use by an inspector. The mobile inspection tool 115 can be in operative communication with the server 105 and data storage 110 via one or more communication networks. The term "communication network" can mean any wired, wireless, or optical networks including, for example, the Internet, intranet, local area network (LAN), Personal Area Network (PAN), Wide Area Network (WAN), Virtual Private Network (VPN), Bluetooth radio, Ethernet network, IEEE 802.11-based radio frequency network, Internet Protocol (IP) network, cellular telephone network, or any other data communication network utilizing physical layers, link layer capability, or network layers to carry data packets, or any combinations of the above-listed data networks. In some embodiments, the communication network includes a corporate network, data center network, service provider network, mobile operator network, or any combinations thereof.

The system 100 for inspecting turbomachinery can further include one or more optional digital measurement tools 120 for making measurements of turbomachinery 125. The digital measurement tools 120 can include, but are not limited to, rulers, scales, sensors, detectors, photo cameras, video cameras, or any other device configured to make measurements or aggregate information related to the turbomachinery 125 or its operation. The digital measurement tools 120 can also be in operative communication with the mobile inspection tools 115 via one or more communication networks. In one example, the digital measurement tool 120 can relate to a digital ruler, which can be used by an inspector for measuring dimensions of particular turbomachinery elements. The measured dimensions can be wirelessly transmitted to the mobile inspection tool 115 for further incorporation with other inspection data (e.g., inspector's answers or measurement inputs). In some embodiments, the digital measurement tools 120 can be integrated into the mobile inspection tools 115.

Thus, an inspector can use the mobile inspection tool 115 and, optionally, digital measurement tools 120 for inspecting the turbomachinery 125 or its operation. The inspection data created or collected by the mobile inspection tool 115 can be automatically propagated to the server 105 for storing in the data storage 110. The inspection data collected over time in the data storage 110 can be analyzed and processed by the server 105 or another computing device. For example, damage accumulation models can be created to monitor defects and predict machinery outages or failures.

Authorized individuals, such as engineers or officers associated with a particular turbomachine, can access the server 105 and data storage 110 to review, monitor, configure, or download the inspection data of this turbomachine. In some embodiments, the authorized individuals can obtain inspection reports generated by the server 105 based on the inspection data. The authorized individuals can access the inspection data of the data storage 110 using the mobile inspection tools 115 or client devices 130. The client devices 130 can refer to computing devices with network interfaces such as personal computers, desktop computers, laptop computers, workstations, smartphones, personal digital assistants, and so forth. The client devices 130 are in operational communication with the server 105 and the data storage 110 via one or more communication networks described above.

Figure 2:
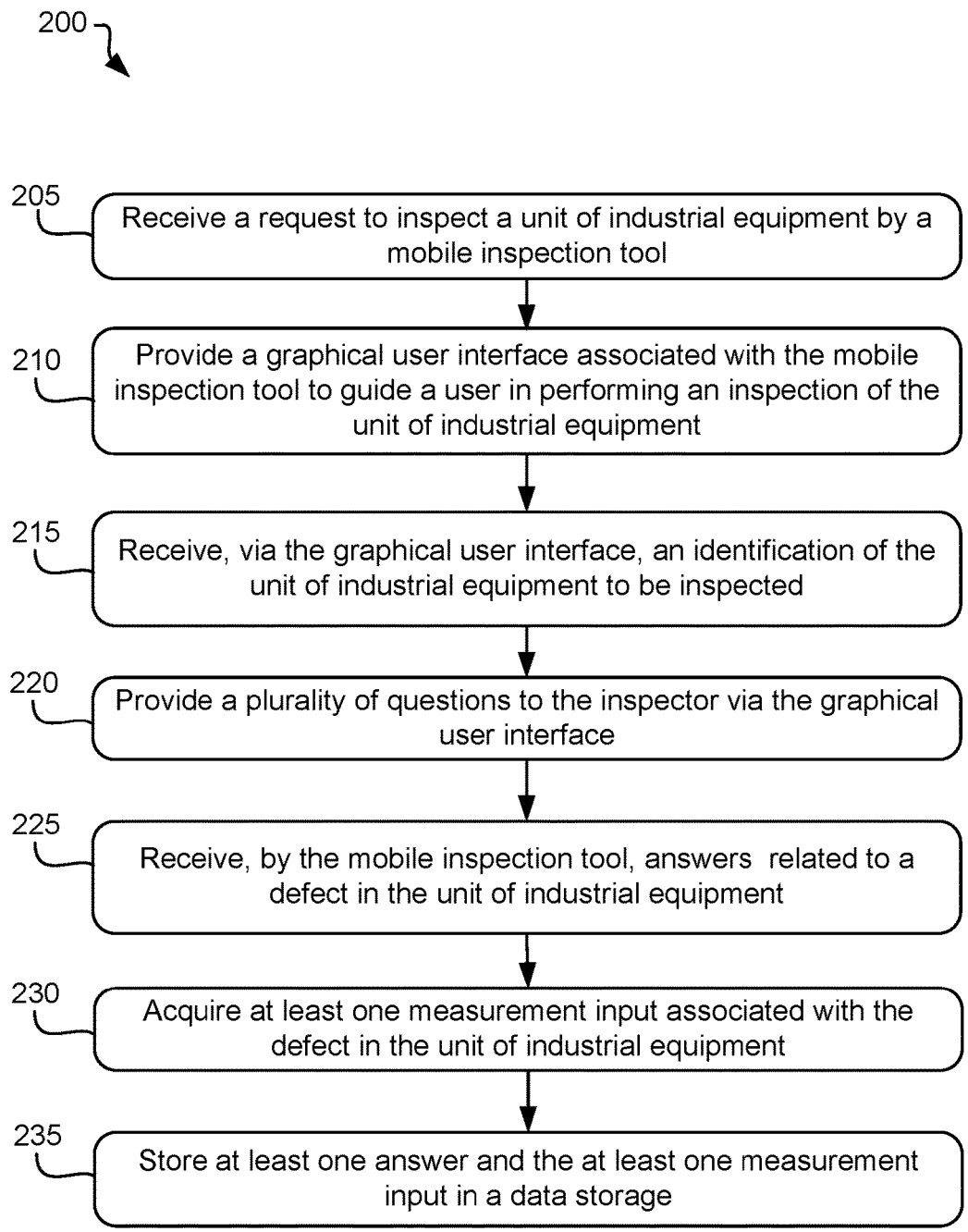
FIG. 2 is a flow chart illustrating an example method for inspecting turbomachinery, according to certain embodiments of the disclosure.

FIG. 2 is a flow chart illustrating an example method 200 for inspecting turbomachinery, according to an embodiment of the disclosure. The method 200 may be performed by processing logic that may comprise hardware (e.g., decision-making logic, dedicated logic, programmable logic, and application-specific integrated circuit), software (such as software running on a general-purpose computer system or a machine), or a combination of both. In one example embodiment, the method 200 can, for example, be implemented in one or more elements of the system 100 for inspecting turbomachinery.

In certain embodiments, the method 200 may be implemented in an order different than described and shown in FIG. 2. Moreover, the method 200 may have additional steps not shown herein, but which can be evident for those skilled in the art from the present disclosure. The method 200 may also have fewer steps than outlined below and shown in FIG. 2.

In block 205, the method 200 may commence with receiving a request to inspect at least one unit of turbomachinery 125 using a mobile inspection tool 115. In some embodiments, an inspector may use the mobile inspection tool 115 to initiate the inspection process and generate a request for inspection. The request can then trigger the inspection routine of a software application running on the mobile inspection tool 115 or server 105. The term "unit of turbomachinery" shall be construed to mean any element or piece of turbo machine or even the whole machine.

In block 210, the software application of the mobile inspection tool 115 or server 105 provides at least one GUI to guide the inspector of the mobile inspection tool 115 in performing the inspection of turbomachinery unit. For example, the server 105 can provide the GUI via one or more web pages or the GUI can be formed by a mobile application running on the mobile inspection tool 115. The GUI can include one or more graphical elements, including text, images, video, audio, clickable buttons, radio buttons, input fields, and so forth.

The inspection process can be started with identification of a particular machine or piece of machine to be inspected. Accordingly, in block 215, the mobile inspection tool 115 receives, from the inspector and via the GUI, an identifier of the turbomachinery unit to be inspected. The identification of turbomachinery unit can include a serial number of the turbomachinery unit or any other identifier. In some embodiments, the identification can be received by mobile inspection tool 115 automatically. For example, the mobile inspection tool 115 can wirelessly read the identification of the turbomachinery unit upon networked communication between the mobile inspection tool 115 and the turbomachinery unit (e.g., using Near Field Communication (NFC) protocols or Bluetooth). In another example, the mobile inspection tool 115 can scan a bar code provided on the turbomachinery 125 to acquire identification.

The identification of a turbomachinery unit can be further used by the server 105 or mobile inspection tool 115 to retrieve a particular inspection guide. Thus, in block 220, the mobile inspection tool 115 or server 105 provides, via the GUI, a plurality of questions to the inspector based on the identification. These questions can guide the inspector in locating and measuring at least one defect in the turbomachinery unit.

In response to the plurality of questions, in block 225, the mobile inspection tool 115 or server 105 receives one or more answers via the GUI. At least one answer is related to a defect in the unit of turbomachinery 125. In some embodiments, at least one of the answers can include a selected standardized defect of the unit of turbomachinery 125. In other words, some of the answers can be standardized or predetermined to facilitate uniformity. For example, at least one of the answers can be a standardized description of a defect.

In block 230, the mobile inspection tool 115 or server 105 acquires at least one measurement input associated with the defect in the unit of turbomachinery 125. The measurement input can be made by the inspector manually and then input into a respective input field of the GUI. In other embodiments, the measurement input can be acquired automatically by receiving measuring data from the digital measurement tools 120, cameras, sensors, detectors, or other digital measuring devices. The measurement input can refer to an electrical signal (analog or digital), numerical value, numerical range, image, audio, video, and so forth.

Blocks 220, 225, and 230 can be repeated multiple times as needed. Accordingly, in blocks 220 through 230, the inspector is guided through an inspection process and instructed to make one or more measurements or make one or more inputs characterizing a defect or a particular turbomachinery element. For example, a first question can be "Are there any defects?" The inspector can be prompted to answer "yes" or "no" via the GUI by clicking a respective button. When the inspector clicks a button, a first answer is automatically rendered and delivered to the server 150. Further, in response to the first answer, a second question can be provided via the GUI. The second question can include the text "Where on the machine is the defect found?" and a plurality of predetermined answers. The inspector can provide a second answer simply by selecting one of the predetermined answers. In response to the second answer, the inspector is provided, via the GUI, with an instruction on how to reach a particular turbomachinery part and how to make a particular measurement. The measurement can be made manually by the inspector and a measurement value can be input into a respective field in the GUI as a third answer. Alternatively, the mobile inspection tool 115 can cause the digital measurement tool 120 to make a certain measurement and electronically receive (e.g., wirelessly) a respective measurement value from the digital measurement tool 120. In some embodiments, the inspector's answers can include images, audio, or videos captured by a camera of the mobile inspection tool 115 or any other camera or any other measuring device connected to the mobile inspection tool 115. The number of questions and answers is not limited and may be customized depending on a particular machine and defect. The answers can include anything that can characterize the defect or the turbomachinery unit or its operation.

In certain embodiments, each answer and each measurement input can be associated by the mobile inspection tool 115 or server 105 with a time and a date when the answer or measurement input is made. Moreover, in some embodiments, the mobile inspection tool 115 or server 105 can attribute metadata tags to the answers and measurement inputs. The metadata tag can be created based on the identification of turbomachinery. Accordingly, the metadata tags associate particular answers and measurement inputs with a particular turbomachinery unit. The metadata tags further help in searching, querying, processing, and analyzing the inspection data stored in the data storage 110.

In block 235, the server 105 stores the inspection data, which includes at least one answer containing a metadata tag and at least one measurement input containing a metadata tag, in the data storage 110. In certain embodiments, the inspection data is stored in a data container, which is available for a plurality of client devices 110 and for a plurality of mobile inspection tools 115 for reviewing, monitoring, and downloading. The data container can be a part of a database operable to be searched and queried.

In certain embodiments, the inspection data can be processed by the server 105 to generate inspection reports associated with at least one turbomachinery unit. The reports can then be delivered to the authorized individuals or inspectors. Furthermore, in certain embodiments, the inspection data stored in the data storage 110 can be used to build or update at least one damage accumulation model associated with a particular defect or particular turbomachinery unit. Damage accumulation models can be individually created and may vary depending on a defect. For example, some damage accumulation models can include probabilistic or heuristic models. The server 105 can further predict a failure or outage of the unit of turbomachinery 125 based on the damage accumulation model. In other words, the server 105 can determine residual life of the turbomachinery unit based on the damage accumulation models.

In yet more embodiments, the data storage 110 can aggregate the inspection data from a plurality of turbomachines or a plurality of units of turbomachinery 125. The server 105 can periodically evaluate the inspection data and select a candidate turbomachinery unit from the plurality of turbomachinery units for an inspection based on the evaluation and predetermined criteria. This process facilitates inspection planning such that relatively new turbomachinery units can be inspected rarely, but relatively old turbomachinery units with found defects can be inspected more frequently.

Figure 3:
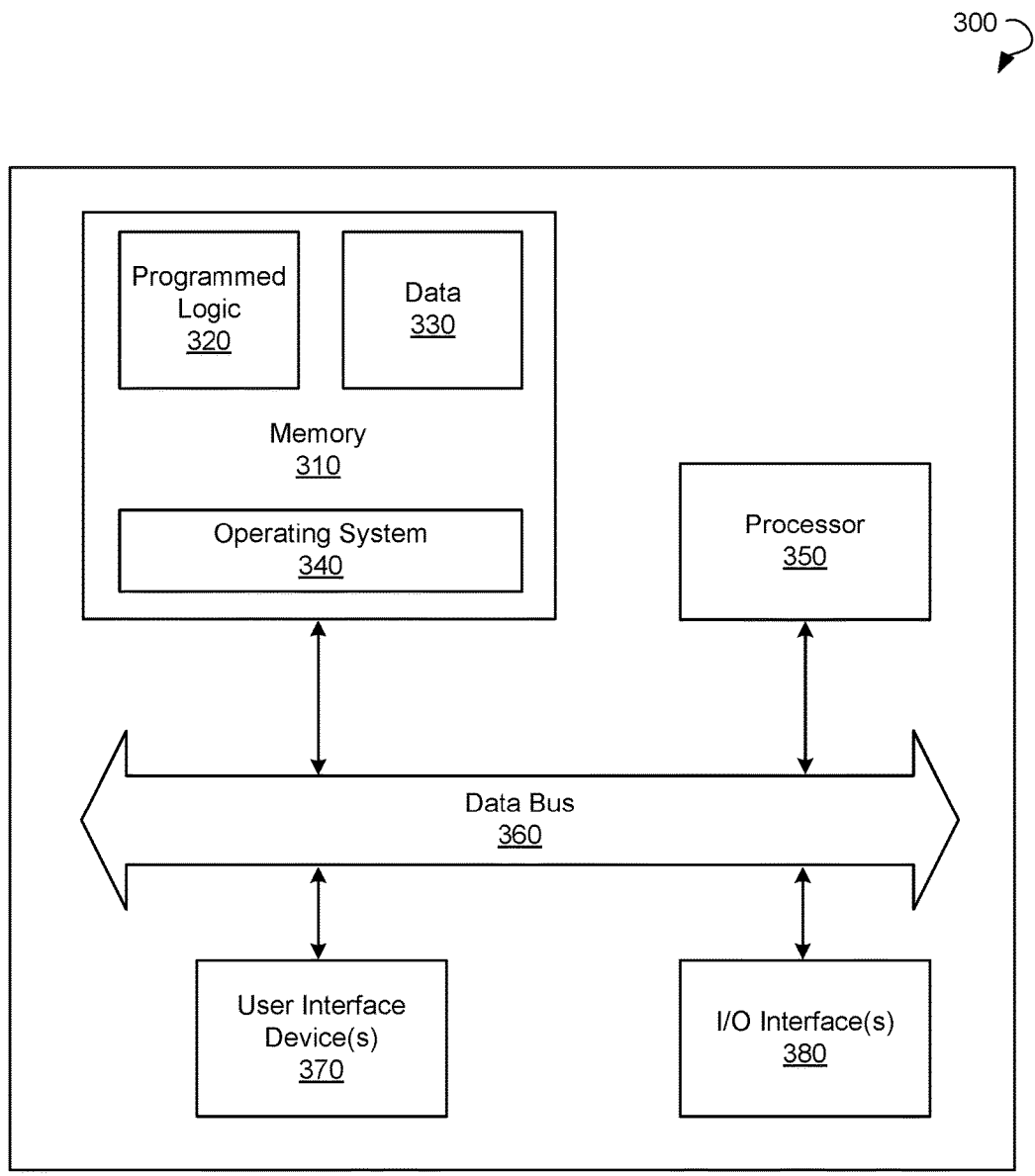
FIG. 3 is a block diagram illustrating an example computing system for inspecting turbomachinery, in accordance with certain embodiments of the disclosure.

FIG. 3 is a block diagram illustrating an example computing system 300 for inspecting turbomachinery, in accordance with some embodiments of the disclosure. For example, the computing system 300 can refer to at least one of the server 105, mobile inspection tool 115, and client device 130. As shown in the figure, the computing system 300 may include a memory 310 that stores programmed logic 320 (e.g., software) and may store data 330, such as inspection data. The memory 310 may also include an operating system 340.

A processor 350 may utilize the operating system 340 to execute the programmed logic 320, and in doing so, may also utilize the data 330. A data bus 360 may provide communication between the memory 310 and the processor 350. Users may interface with the computing system 300 via at least one user interface device 370, such as a keyboard, keypad, mouse, touchscreen, display, control panel, or any other devices capable of communicating data to and from the computing system 300. In some embodiments, the user interface device 370 can include a photo camera or video camera. The computing system 300 may be in communication with other networked devices (e.g., servers, mobile inspection tools, etc.) via an input/output (I/O) interface 380.

Further, the computing system 300 and the programmed logic 320 implemented thereby may include software, hardware, firmware, or any combination thereof. The computing system 300 may carry out the execution of the method for inspecting turbomachinery as described above. It should also be appreciated that multiple systems 300 may be used, whereby different features described herein may be executed on one or more different systems 300.

Accordingly, certain embodiments described herein can allow for inspecting turbomachinery. In this document, references are made to block diagrams of systems, methods, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a non-transitory, computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide operations for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for inspecting a machine, the system comprising:
   a server including a data storage device accessible by a plurality of client devices via at least one communication network; and
   a mobile inspection tool operatively coupled to the server via the at least one communication network, wherein the mobile inspection tool is operable to perform the following operations:
      initiate, in response to a request, an inspection routine of a software application displayed by the mobile inspection tool, wherein the inspection routine comprises one or more inspection questions for inspecting at least one unit of a machine;
      provide a graphical user interface to guide a user of the mobile inspection tool in performing the inspection;
      receive, via the graphical user interface, an identification of the unit of the machine to be inspected;
      based on the identification, provide, via the graphical user interface, the one or more inspection questions to the user;
      responsive to the one or more inspection questions, receive at least one answer from the user, wherein the at least one answer is related to a defect in the unit of the machine;
      acquire at least one measurement input associated with the defect in the unit of the machine;
      cause the server to store the at least one of the answer and the at least one measurement input in the data storage device; and based at least in part on the at least one of the answer and the at least one measurement input, build a damage accumulation model associated with the unit of the machine or the defect, wherein the damage accumulation model is used to predict an expected failure or outage.

2. The system of claim 1, wherein the mobile inspection tool is operable to perform the following operations:
associate a time and a date with the at least one answer and the at least one measurement input; and
attribute a metadata tag to the at least one answer and to the at least one measurement input, wherein the metadata tag is associated with the unit of the machine.

3. The system of claim 1, wherein the identification of the unit of the machine includes a serial number associated with the unit of the machine.

4. The system of claim 1, wherein at least one of the one or more inspection questions guides the user in locating and measuring the defect.

5. The system of claim 1, wherein the at least one answer includes a selected standardized defect of the unit of the machine.

6. The system of claim 1, further comprising:
a digital measurement tool in operative communication with the mobile inspection tool, wherein the mobile inspection tool is further operable to perform the following operations:
cause the digital measurement tool to measure the defect to produce a measurement value; and
wirelessly receive the measurement value from the digital measurement tool, wherein the measurement value includes at least a part of the at least one measurement input.

7. The system of claim 1, wherein the at least one measurement input includes an image or a video of the defect.

8. The system of claim 1, wherein the at least one of the answers and the at least one measurement input are stored in a data container available to a plurality of client devices and a plurality of mobile inspection tools; and
wherein data associated with the data is available for searches and queries.

9. The system of claim 1, wherein at least one of the mobile inspection tool and the server is further operable to perform the following operations:
build a damage accumulation model based on the at least one answer and the at least one measurement input stored in the data storage; and
based on the damage accumulation model, predict a failure of the unit of the machine.

10. A method for inspecting turbomachinery, the method comprising:
initiating, by a mobile inspection tool, in response to a request to inspect at least one unit of turbomachinery, an inspection routine of a software application displayed by the mobile inspection tool, wherein the inspection routine comprises one or more inspection questions for inspecting the at least one unit of turbomachinery;
providing a graphical user interface associated with the mobile inspection tool to guide a user of the mobile inspection tool in performing an inspection of the unit of turbomachinery;
receiving, via the graphical user interface, an identification of the unit of turbomachinery to be inspected;
based on the identification, providing, via the graphical user interface, the one or more inspection questions to the user;
responsive to the one or more inspection questions, receiving at least one answer by the mobile inspection tool, wherein the at least one answer is related to a defect in the unit of turbomachinery;
acquiring at least one measurement input associated with the defect in the unit of turbomachinery;
storing, by a server, the at least one answer and the at least one measurement input in a data storage device; and
based at least in part on the at least one of the answer and the at least one measurement input, building a damage accumulation model associated with the unit of the machine or the defect, wherein the damage accumulation model is used to predict an expected failure or outage.

11. The method of claim 10, further comprising:
associating a time and a date with the at least one answer and the at least one measurement input; and
attributing a metadata tag to the at least one answer and to the at least one measurement input, wherein each of the metadata tags is associated with the unit of turbomachinery.

12. The method of claim 10, wherein the identification of the unit of turbomachinery includes a serial number associated with the unit of turbomachinery.

13. The method of claim 10, wherein the at least one of one or more inspection questions guides the user in locating and measuring the defect.

14. The method of claim 10, wherein the at least one answer includes a selected standardized defect of the unit of turbomachinery.

15. The method of claim 10, wherein the acquiring of the at least one measurement input associated with the defect in the unit of turbomachinery includes:
causing, by the mobile inspection tool, a digital measurement tool to determine a measurement of the defect; and
wirelessly receiving, by the mobile inspection tool, the measurement from the digital measurement tool.

16. The method of claim 10, wherein the at least one measurement input includes an image or a video of the defect.

17. The method of claim 10, wherein the at least one answer and the at least one measurement input are stored in a data container available for a plurality of client devices and a plurality of mobile inspection tools; and
wherein the data container is a part of a database operable to be searched and queried.

18. The method of claim 10, further comprising:
building a damage accumulation model based on the at least one answer and the at least one measurement input stored in the data storage device; and
based on the damage accumulation model, predicting a failure of the unit of turbomachinery.

19. The method of claim 10, further comprising:
collecting, by the server, in the data storage device, inspection data related to a plurality of units of turbomachinery, wherein the inspection data includes the at least one answer and the at least one measurement input;
periodically evaluating the inspection data by the server; and
based on the evaluation, selecting, from the plurality of units of turbomachinery, one candidate unit of turbomachinery for an inspection.

20. A non-transitory processor-readable medium having software codes stored thereon, wherein when the software codes are executed by one or more processors, the software codes cause the one or more processors to implement the following operations:

initiate, in response to a request to inspect at least one unit of turbomachinery, an inspection routine of a software application displayed by a mobile inspection tool, wherein the inspection routine comprises one or more inspection questions for inspecting the at least one unit of turbomachinery;

provide a graphical user interface associated with the mobile inspection tool to guide a user of the mobile inspection tool in performing an inspection of the unit of turbomachinery;

receive, via the graphical user interface, an identification of the unit of turbomachinery to be inspected;

based on the identification, provide via the graphical user interface, a plurality of questions to the user;

responsive to the plurality of questions, receive at least one answer by the mobile inspection tool, wherein the at least one answer is associated with a defect in the unit of turbomachinery;

acquire at least one measurement input associated with the defect in the unit of turbomachinery;

cause storing, by a server, the at least one answer and the at least one measurement input in a data storage device; and based at least in part on the at least one of the answer and the at least one measurement input, build a damage accumulation model associated with the unit of the machine or the defect, wherein the damage accumulation model is used to predict an expected failure or outage.

\* \* \* \* \*